United States Patent [19]

Eckman

[11] 4,258,799
[45] Mar. 31, 1981

[54] INLET CONTROL VALVE

[75] Inventor: Richard E. Eckman, Houston, Tex.

[73] Assignee: Dresser Industries, Inc., Dallas, Tex.

[21] Appl. No.: 97,621

[22] Filed: Nov. 27, 1979

[51] Int. Cl.³ .............................................. B23B 45/04
[52] U.S. Cl. ............................... 173/169; 137/630.15
[58] Field of Search .................. 173/169, 18, 161, 170, 173/171; 137/614.17, 630, 630.15

[56] References Cited

U.S. PATENT DOCUMENTS

| | | | |
|---|---|---|---|
| 1,096,220 | 5/1914 | Brooks | 137/630.15 |
| 2,369,104 | 2/1945 | Fredrickson | 137/630 X |
| 3,102,555 | 9/1963 | Botkin | 137/630.15 |
| 3,443,646 | 5/1969 | Baker et al. | 173/169 |
| 3,726,303 | 4/1973 | Allen et al. | 137/630.15 |

FOREIGN PATENT DOCUMENTS 2398581 3/1979 France ..................... 173/169

*Primary Examiner*—Ronald Feldbaum
*Attorney, Agent, or Firm*—Roy L. Van Winkle; John N. Hazelwood

[57] ABSTRACT

The inlet control valve described herein is useful in connection with pneumatic tools or the like that include a hollow tool body containing an air motor. A control valve is disposed in an inlet passageway extending to the air motor. The valve includes a first valve member that has a seal engaging an annular valve seat. A second valve member extends through a bore in the first valve member and is disposed in sealing engagement with a second annular seal member carried by the first valve member. The second valve member includes an operating member that also extends through the bore into engagement with the trigger mechanism of the tool so that displacement of the trigger to a first position tilts the second valve member off its seat permitting restricted flow through the passageway. Additional movement of the trigger displaces the first or main valve member off its seat permitting the maximum flow through the passageway.

5 Claims, 4 Drawing Figures

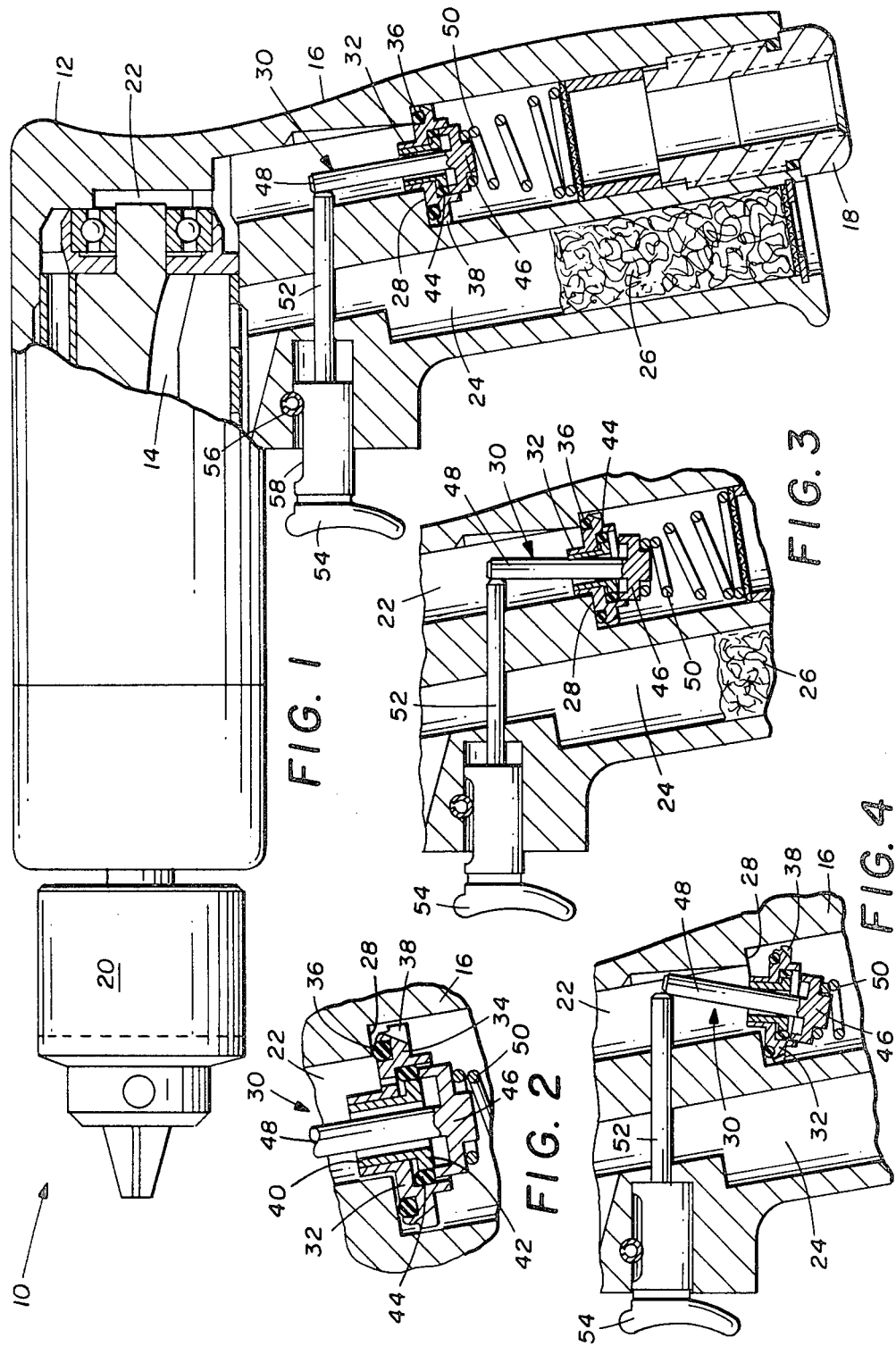

INLET CONTROL VALVE

BACKGROUND OF THE INVENTION

This invention relates generally to improved inlet control valves for air tools or the like. More particularly but not by way of limitation, this invention relates to an improved inlet control valve that includes first and second valve members independently movable to provide different flow volumes therethrough to control the speed of the air motor.

For some time, various air tools have incorporated a tilting valve in the inlet supply passageway. Such valves function very well and provide a reliable valve that is easy to maintain and operate. However, it is sometimes desirable to be able to provide a restricted air flow to the motor, such as when starting a drill so that the drill will rotate very slowly. With the single tiltable valve mechanism, it was extremely difficult to try to maintain the exact amount of force on the valve through the trigger mechanism to restrict the flow to a constant amount to prevent the motor from running faster than desired.

An object of this invention is to provide an improved flow control valve that is of the tilt-valve type wherein a positive control is attained to provide restricted flow and, yet, one in which full depression of the operating trigger will cause full air flow to the air motor.

SUMMARY OF THE INVENTION

This invention provides an improved inlet control valve for pneumatic tools or the like that include a hollow tool body containing an air motor and wherein the body includes an inlet passageway that extends therethrough in connection with the air supply to the air motor and that has an annular valve seat encircling the passageway. The improved valve comprises an annular first valve member that is located in the body in sealing engagement with the valve seat. The annular valve member has a bore extending therethrough and includes a second annular seat that encircles the bore in the first valve member. A second valve member is movably located in the body and includes a surface that is engageable with the valve seat on the first valve member and also includes an elongated valve operating portion that extends through the bore in the first valve member. A valve operating member slidingly disposed in the tool body is engageable with the elongated valve operating portion of the second valve member and is movable between the first position wherein the second valve member is tilted out of engagement with the valve seat on the first valve member providing a restricted flow therethrough and a second position wherein the first valve member is moved away from the seat on the body to provide full flow through the inlet passageway.

BRIEF DESCRIPTION OF THE DRAWING

The foregoing and additional objects and advantages of the invention will become apparent as the following detailed description is read in conjunction with the accompanying drawing wherein like reference characters denote like parts in all views and wherein:

FIG. 1 is a view, partially in elevation and partially in cross-section, of an air tool that includes the improved inlet control valve constructed in accordance with the invention.

FIG. 2 is an enlarged, cross-sectional view illustrating in more detail the structure of the inlet control valve.

FIG. 3 is a fragmentary cross-sectional view illustrating the inlet control valve of the invention in a second operating position.

FIG. 4 is a view similar to FIG. 3, but illustrating the inlet control valve in the fully open position.

DETAILED DESCRIPTION OF THE PREFERRED EMBODIMENT

Referring to the drawing and to FIG. 1 in particular, shown therein and generally designated by the reference character 10 is a pneumatically driven tool, which in this case, is depicted as being a drill. The tool 10 includes a body 12 that includes in the interior thereof an air motor 14 of conventional construction. Depending from the body 12 is a handle portion 16 including a fitting 18 for connecting the tool 10 to an air supply (not shown). On the other end of the body 12, there is shown a chuck 20 that is of conventional construction and arranged to accept a drill bit (not shown).

Within the body 12 there is provided an air passageway 22 that extends through the body into the air motor 14 and connects the air motor 14 to the air supply via the fitting 18.

The body 12 also includes an exhaust passageway 24 through which air passes from the air motor 14 back to the atmosphere via a muffler 26. As shown more clearly in FIG. 4, the passageway 22 is counterbored adjacent to the fitting 18, forming an annular valve seat 28 for the valve assembly which is generally designated by the reference character 30.

The valve assembly 30 includes a first or main valve member 32 that has an annular flange portion 34 projecting radially outwardly and encompassing an annular, O-ring seal 36 that sealingly engages the seat 28 as illustrated in FIGS. 1 and 2. The main valve member 32 has a plurality of slots 38 (see FIG. 2) spaced circumferentially around the outer periphery thereof for the purpose of providing a greater flow area when the valve member 32 is off the seat 28 as illustrated in FIG. 4.

Disposed within a bore extending through the valve member 32 is a sleeve 40 that has a flange 42 formed on the lower end thereof to retain an O-ring seal 44 in the main valve member 32. A second valve member 46 is disposed in sealing engagement with the O-ring seal 44 and includes an elongated valve operating portion 48 that extends through the sleeve 40 for reasons that will be explained more fully in connection with the remaining figures of the drawing.

The valve assembly 30 is constantly biased toward the closed position as illustrated in FIGS. 1 and 2 by a tapered helical spring 50 that has one end retained or fixed in the body 12 and the opposite end in engagement with the second valve member 46.

In engagement with the upper end of the valve operating portion 48, is a valve operating member 52 that is slidingly located in the handle 16. The end of valve operating member 52 remote from its engagement with the valve operating portion 48 is formed into a trigger 54. The valve operating member 52 is prevented from dropping out of the handle 16 by a roll pin 56 that operates in a slot 58 formed in the trigger 54.

OPERATION OF THE PREFERRED EMBODIMENT

With the tool 10 connected to the air supply through the fitting 18, the operator of the tool moves the trigger 54 toward the right as shown in the drawing until it reaches the position illustrated in FIG. 3. When this occurs, it can be seen that the valve operating portion 48 is displaced to the right thereby tilting the valve member 46 so that a portion thereof is disengaged from the O-ring seal 44, permitting the flow of air through the passageway 22, past the valve member 46 and seal 44 through the bore extending in the sleeve 40 that is located in the first valve member 32. Due to the relatively limited flow of air therethrough, the air motor 14 will of course rotate rather slowly permitting the operator of the tool 10 to start the drill bit (not shown) without damaging the surface in which the hole is to be drilled.

When the hole has been started and it is desired to operate the drill 10 at full speed, the operator depresses the trigger 54 further until it reaches the position shown in FIG. 4, displacing the valve operating portion 48 farther to the right. Such movement will be stopped when the portion 48 engages the handle 16.

In this position, and as clearly shown in FIG. 4, the O-ring seal 36 has been moved away from the annular seat 28. It will also be observed that the second valve member 46 remains off its 0-ring 44 so that the air may flow past both of the valve members through the passageway 22 to the air motor 14. To provide additional air flow area, the outer periphery of the valve member 32 has been provided with a plurality of slots 38.

Releasing the trigger 44, permits the spring 50 to return the valve members 32 and 46 to the original closed position as illustrated in FIGS. 1 and 2.

Although it is not apparent from the drawing or structural description, there is a distinct difference in the force required on the trigger 54 to open the second valve member 46 and the force required to open the first valve member 32 so that the operator of the tool 10 can clearly distinguish by feel when he has opened only the second valve member 46 to attain the slow speed operation.

From the foregoing it will be apparent that the valve assembly 30 described provides the highly desirable characteristic of permitting the tool 10 to be operated at the low speed until it is desired to obtain full tool speed.

It should also be noted that but a signle embodiment of the invention is described in detail hereinbefore, and that such embodiment is presented by way of example only and that there can be many changes and modifications made thereto without departing from the spirit of the invention.

The embodiments of the invention in which an exclusive property or privilege is claimed are defined as follows:

1. An improved inlet control valve for pneumatic tools or the like that include a hollow tool body containing an air motor, the body including an inlet passageway extending therethrough from a connection with a source of pneumatic pressure to the air motor, and having a surface therein encircling the passageway forming a valve seat, the improved valve comprising:
    an annular first valve member movably located in the body and sealingly engageable with the valve seat, said annular valve member having a bore extending therethrough and having an annular seat encircling said bore;
    a second valve member movably located in the body and including a surface engageable with a valve seat on said first valve member to form a fluid-tight seal therewith, said second valve member also including an elongated valve operating portion extending through the bore in said first valve member;
    resilient means located in the body and engaging the second valve member for urging said first and second valve members toward their respective seats; and,
    a valve operating member slidingly disposed in the body for engaging the elongated valve operating portion of said second valve member, said operating member being movable to a first position wherein the second valve member is tilted out of engagement from the valve seat on said first valve member, opening the bore through said first valve member to fluid flow and being movable to a second position to tilt said first valve member away from the seat on the body opening the valve to permit full flow through the inlet passageway.

2. The valve of claim 1 and also including:
    a first annular seal member encircling said first valve member for sealingly engaging the seat on the tool body; and,
    a second annular seal member located on said first valve member for sealingly engaging said second valve member.

3. The valve of claim 2 and also including a sleeve member frictionally retained in the bore in said first valve member having a flange portion for retaining said second annular seal member on said first valve member.

4. The valve of claim 3 wherein said first valve member has a plurality of slots in the outer periphery thereof for permitting increased fluid flow between said periphery and the body when said first valve member is off the seat in the body.

5. The valve of claim 1 wherein said resilient means in a tapered, helical spring having one end engaging the body and the other end engaging said second valve member.

* * * * *